US005826780A

United States Patent [19]

Neeser et al.

[11] Patent Number: 5,826,780

[45] Date of Patent: Oct. 27, 1998

[54] VACUUM INSULATION PANEL AND METHOD FOR MANUFACTURING

[75] Inventors: Timothy A. Neeser, Savage; Bruce E. Lyman, Northfield, both of Minn.; Stanley J. Rusek, Jr., Newark, Ohio

[73] Assignee: MVE, Inc, Bloomington, Minn.

[21] Appl. No.: 618,173

[22] Filed: Mar. 19, 1996

Related U.S. Application Data

[62] Division of Ser. No. 271,163, Jul. 6, 1994, abandoned.

[51] Int. Cl.[6] .................................................... B23K 31/02

[52] U.S. Cl. .......................... 228/217; 228/232; 228/245

[58] Field of Search .................................... 228/221, 232, 228/217, 212; 428/621, 632, 633, 69, 76, 593; 220/420, 421

[56] References Cited

U.S. PATENT DOCUMENTS

| | | | |
|---|---|---|---|
| 2,745,173 | 5/1956 | Janos | 29/455 |
| 2,768,046 | 10/1956 | Evans . | |
| 3,004,877 | 10/1961 | Simms et al. . | |
| 3,156,975 | 11/1964 | Shaw | 228/221 |
| 3,179,549 | 4/1965 | Strong et al. . | |
| 3,656,225 | 4/1972 | Bereza | 228/221 |
| 3,892,030 | 7/1975 | De Pierre et al. | 29/420 |
| 4,000,246 | 12/1976 | Walles . | |
| 4,154,363 | 5/1979 | Barthel | 220/421 |
| 4,161,809 | 7/1979 | Severson | 228/221 |
| 4,444,821 | 4/1984 | Young et al. . | |
| 4,486,482 | 12/1984 | Kobayashi et al. | 428/69 |
| 4,668,551 | 5/1987 | Kawasaki et al. . | |
| 4,702,963 | 10/1987 | Phillips et al. . | |
| 4,726,974 | 2/1988 | Nowobilski et al. . | |
| 4,798,753 | 1/1989 | Abuaf et al. . | |
| 5,018,328 | 5/1991 | Cur et al. . | |
| 5,090,981 | 2/1992 | Rusek, Jr. . | |
| 5,091,233 | 2/1992 | Kirby et al. . | |
| 5,094,899 | 3/1992 | Rusek, Jr. . | |
| 5,153,977 | 10/1992 | Toida et al. | 29/455.1 |
| 5,257,731 | 11/1993 | Nonoyama et al. | 228/221 |
| 5,286,320 | 2/1994 | McGrath et al. . | |
| 5,328,336 | 7/1994 | Nowobilski | 417/48 |
| 5,330,816 | 7/1994 | Rusek, Jr. | 428/69 |

*Primary Examiner*—Samuel M. Heinrich
*Attorney, Agent, or Firm*—Rudnick & Wolfe

[57] ABSTRACT

A vacuum panel includes a jacket having a bottom that is formed into a "pan" shape. A top is welded to the flanges of the bottom to create a hermetic seal therebetween. A dense glass fiber mat fills the jacket. A getter is strategically located in the panel to absorb residual gases in the panel and maintain the vacuum life. To create the vacuum in the panel, the panel is heated to a specified temperature and time, and evacuated through an opening. The opening is sealed with a braze seal that is melted over the opening.

17 Claims, 4 Drawing Sheets

SIMULTANEOUS HEAT AND VACUUM DRAW DOWN

VACUUM INSULATION PANEL AND METHOD FOR MANUFACTURING

This is a divisional of application Ser. No. 08/271,163 filed on Jul. 6, 1994, now abandoned.

BACKGROUND OF THE INVENTION

The invention relates, generally, to insulating panels and, more particularly, to an improved thermal insulation vacuum panel.

Thermal insulation vacuum panels typically consist of a thermally insulative media retained in an enclosure. A vacuum is created in the enclosure to minimize heat transfer through the panel. Examples of such panels are found in U.S. Pat. Nos. 4,444,821, 4,668,551, 4,702,963, and 4,726,974. As is evident from these patents, a wide variety of materials have been used for the insulating material and the enclosure. See, for example, U.S. Pat. No. 5,252,408 wherein a particulate block, such as carbon black is used for the dual purpose of insulation and gettering.

These panels are used in a wide variety of applications such as refrigerator walls, oven walls, cryogenic vessels and other devices requiring thermal insulation. While such panels provide thermal insulation to some degree, the existing panels have undesirable characteristics. For example, in some cases, the insulating media outgases thereby degrading the vacuum in the panel-and reducing the effectiveness of the insulation, have low melting temperatures or do not have compressive strength. In some panels the enclosures are not sufficiently gas impermeable, have low operating temperature limits or do not have the necessary structural strength for desired applications. moreover, to provide suitable insulation characteristics the prior art panel s tend to be relatively thick and heavy.

Thus, an improved thermal insulation vacuum panel is desired which is economical, has high performance in terms of insulation value, has a relatively long life, and is self-supporting.

SUMMARY OF THE INVENTION

The vacuum panel of the invention consists of a stainless steel jacket. The jacket includes a bottom that is preferably formed into a "pan" shape. A flat or pan top is welded to the flanges of the bottom to create a hermetic seal therebetween. A dense fiberglass mat fills the panel. Getters are located in the panel to absorb residual gases in the panel and to maintain the vacuum life.

In accordance with the present invention, preferably a prebake step precedes panel evacuation. This greatly enhances the creation of a vacuum in the panel. To create the vacuum in the panel, air is evacuated through a slit-like or slotted opening which is then sealed with a braze seal.

DETAILED DESCRIPTION OF THE INVENTION

Figure 1:
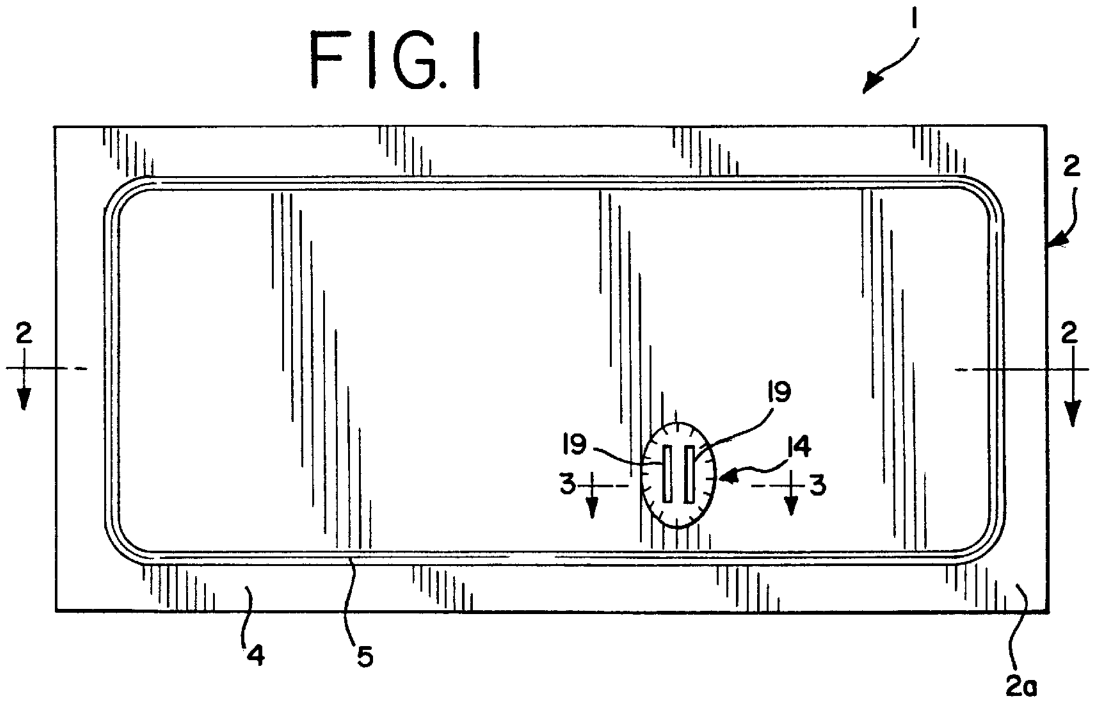
FIG. 1 is a bottom view of the vacuum panel of the invention.
Figure 2:
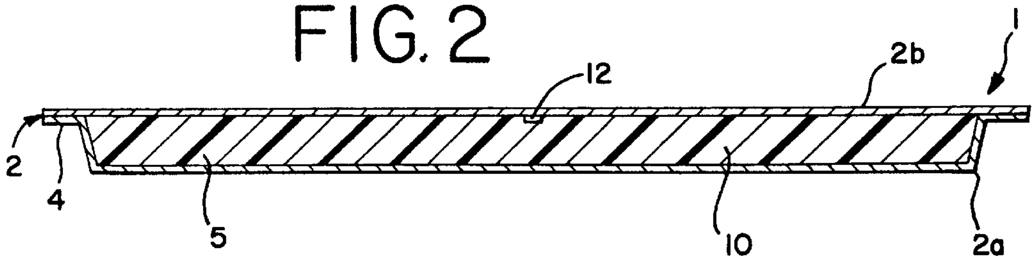
FIG. 2 is a section view along line 2—2 of FIG. 1.

Referring more particularly to FIGS. 1 and 2, the vacuum panel of the invention is shown generally at 1 and consists of a metal jacket 2. The jacket 2 includes a bottom 2*a* and a top 2*b*. The bottom is preferably formed into a "pan" shape having a cavity 5 for receiving the insulating media and a flat flange 4 extending around the periphery thereof. An evacuation port or opening is formed in bottom 2*a* or top 2*b* to provide a vacuum as will hereinafter be described. It is important that the flange 4 be flat, unthinned, and wrinkle free to permit a hermetic seal with top 2*b*. The top which may be flat, pan shaped or other appropriate configuration, is welded to flange 4 to create the hermetic seal preferably using either laser welding or a roll resistance seam welding process.

Preferably, both the jacket top and bottom are made of 3 mil stainless steel; however, carbon steel or other suitable material may be used. For example, T304L stainless steel is particularly well suited for the vacuum panel of the invention because it is not gas permeable and is cost effective, readily available, formable, has low outgassing, good corrosion resistance, and a high melting temperature. Also, very important in this application, is that the jacket material has a relatively low thermal conductivity. This is necessary to reduce edge losses.

Disposed in jacket 2 is an insulating media 10.

Insulating media 10 consists of a dense glass wool manufactured by Owens-Corning Fiberglass, Toledo, Ohio having a density in the range of 9.0 to 20.0 pounds per cubic foot. The dense glass media opposes atmospheric pressure that tends to collapse the jacket after the panel is evacuated. The glass wool media also has minimal outgassing, low cost, low thermal conductivity, low emissivity and a high melting temperature. To reduce the panel evacuation time and improve vacuum life, it is preferable to bake out the media to approximately 600° F. to drive off the moisture and gases in the glass wool media before it is sealed in the jacket. This is preferably accomplished by prebaking the panel while the glass wool media is at atmospheric pressure. The prebake significantly reduces the evacuation cycle time by reducing the quantity of air molecules contained in the jacket. Subsequent evacuation in a vacuum chamber is then quickly and efficiently accomplished.

Also located in jacket 2 is a getter system 12. One preferred getter is manufactured by SAES GETTERS, Colorado Springs, Colo. type ST301. Another suitable getter system employs a molecular sieve, type 5A in conjunction with palladium oxide. The SAES getter is activated by heating to about 1850° F. for 30 seconds at low vacuum. Once activated, it will absorb most residual gases (i.e., $H_2$, $O_2$, $N_2$ )and water vapor to maintain the vacuum in the panel throughout its extended life. This particular getter is very advantageous when the panels of the present invention are used in high temperature applications because it is activated at, and can withstand high temperatures (for example, above 500° F.). In addition, it may be regenerated by reheating to sufficiently high temperatures.

The use of a molecular sieve (zeolite type) with palladium oxide as a getter system in an evacuated space is preferred for low temperature applications because it is lower cost and quite effective where high temperatures are not encountered. The palladium oxide converts hydrogen gas to water which in turn is absorbed by the molecular sieve along with other gases. Another advantage of the molecular sieve-palladium oxide combination is that it is well suited for the preferred manufacturing cycle which includes a pre-baking step at atmospheric pressure. At temperatures achieved during the prebake, the molecular sieve expels any water vapor it may have absorbed during the assembly process. This insures that the getter is regenerated for maximum effectiveness once the panel is evacuated and sealed off. Another advantage of this system is that no additional heating step is required for activation, as is the case with the SAES getter.

Figure 3:
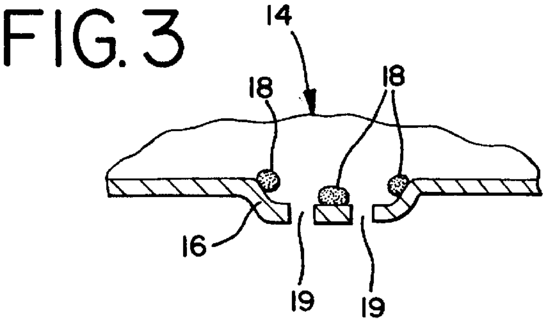
FIG. 3 is a detailed sectional view of the evacuation opening.

To create a vacuum in the panel an opening 14 is provided in the bottom 2_a_ (or alternately the top 2_b_) that communicates the inside of the panel with the atmosphere as best shown in FIG. 3. The evacuation opening 14 is formed in a recess 16. A nickel based braze material 18 is located in recess 16 adjacent, but not blocking the openings which may simply be narrow slots 19. When heated to approximately 1800° F. brazing material 18 will melt and seal the slots 19 to create a hermetic seal. Recess 16 is required to retain the molten braze 18 prior to cooling. The brazing material should have good wetting characteristics to stainless steel without flux, low melting temperature, low base metal erosion, and high ductility (to flex with metal foil). To permit maximum slot width for quick evacuation while still ensuring a hermetic seal, the nickel-braze paste is mixed with a micro-gap filler which consists of a fine particulate which does not melt at the braze temperature. Finally, the braze material should be zinc and cadmium free because these elements will vaporize in a vacuum. In the preferred embodiment the nickel-based brazing-filler alloy BNi-7 per American Welding Society AWS A5.8 is used with micro-gap filler #108 manufactured by Wall Colmonoy Corporation of Madison Heights, Mich. For a typical home appliance panel of modest dimensions, the evacuation slots 19 are desirably 0.025 inches wide by 0.600 inches long. Preferably, two such slots are used adjacent one another. Multiple sets of slots can be installed in larger panels to reduce evacuation cycle time. Conversely, longer or other slot geometries are possible.

Figure 4:
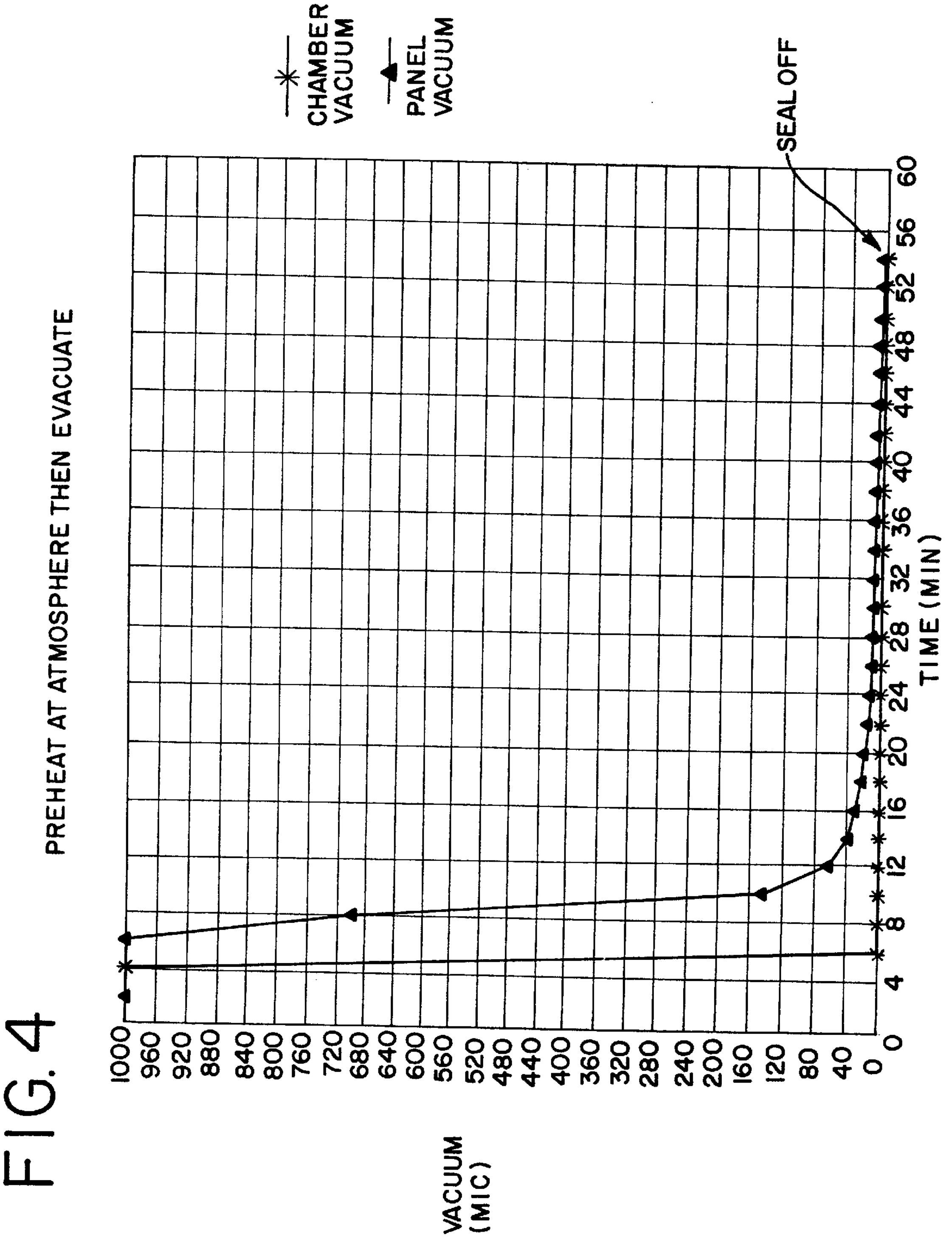
FIGS. 4 and 5 are graphs comparing the results of prebaking to one step evacuation of the panels.
Figure 5:
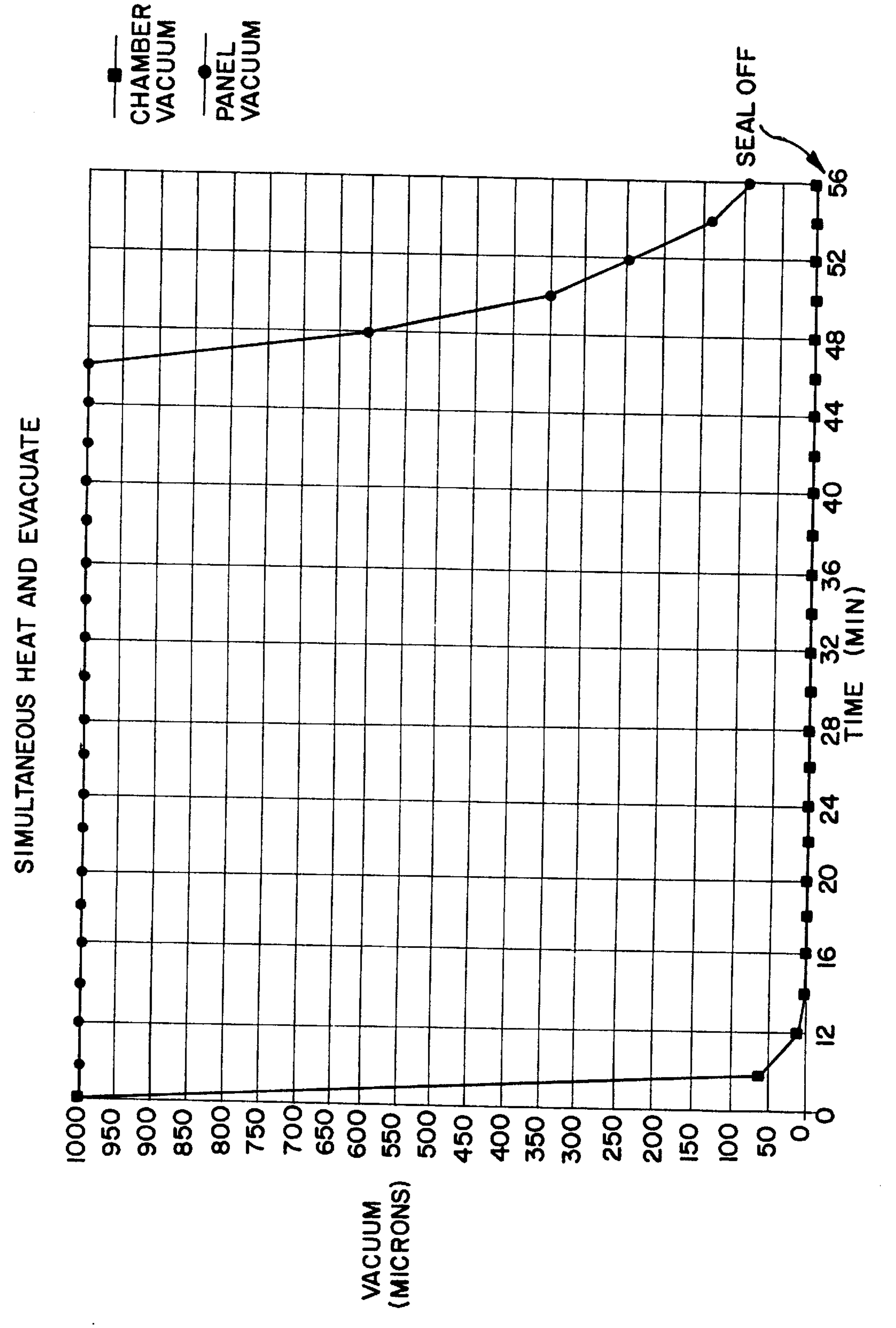

In a preferred embodiment, the panel is preheated to 600° F. in an oven at atmospheric pressure to reduce the panel's internal air density (by up to one-half) and to energize the air and other volatiles. The gas composition in this prebake oven can be dry air or an oxygen free gas mixture as necessary to prevent oxidation of braze or foil panel components or chrome depletion. This preconditions the panel for efficient evacuation. The panel is then promptly placed in a vacuum chamber while it is still hot. Typically, this should occur within about five minutes of the preheat step to obtain maximum benefits. As a result of the atmospheric preheat followed by evacuation of the panel in a vacuum chamber, optimum vacuum levels can be achieved which are not easily obtained without the preheat step. For example, using an atmospheric preheat of 30 to 40 minutes at 600° F. followed by vacuum chamber evacuation, a vacuum of ten microns (mercury) has been obtained within twenty-five minutes. Without the preheat step (instead using a simultaneous heat and evacuate technique, i.e. a one-step technique) typical vacuum results are 100 microns in approximately sixty minutes. These data are shown graphically in FIGS. 4 and 5. Empirical testing of a particular panel configuration quickly yields the necessary preheat period.

The improved vacuum achieved in the panels by employing the atmospheric preheating step (ten versus one hundred microns) is extremely important to the commercial success of the panels. These panels are particularly useful for consumer and commercial appliances which have a useful life of at least ten and often as much as twenty-five years. Better vacuum results in significantly improved thermal performance, lowering operating costs of the appliance. Also, less residual gas results in extended panel life as the getter system will be able to maintain an effective vacuum environment for a longer period of time. By way of comparison, panels have been produced using both the atmospheric preheat technique and the one-step technique. For panels which are otherwise identical in construction, the thermal characteristics (measured at the center of the panel) are:

With preheat R=75 per inch (ten micron vacuum)

Without preheat R=54 per inch (100 microns)

Figure 6:
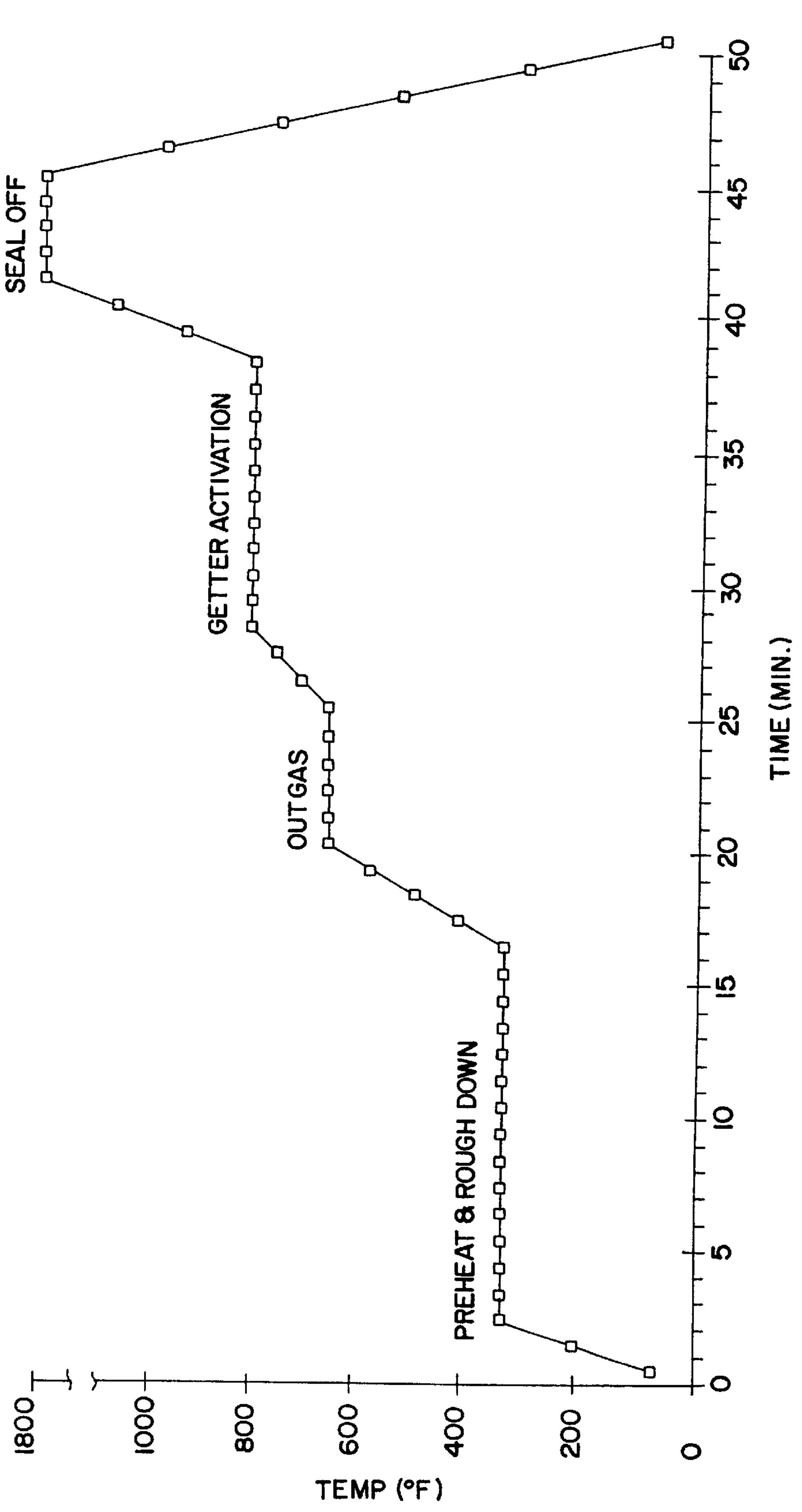
FIG. 6 is a graph showing the heating and evacuation times, temperatures and pressures for the one step process.

In the alternative embodiment which does not use a preheat step, a heated vacuum chamber is used to evacuate and seal the panel and to activate the getter. The panel is inserted in the chamber where the temperature and vacuum are gradually increased in steps (see FIG. 6). As the temperature and vacuum increase, the insulating media is preheated, outgassing is achieved, the getter is activated and the braze is melted to seal the panel. In this embodiment the previously described SAES getter is preferably used. The brazing paste is locally heated to 1800° F. as, for example, by a resistive heater disposed within the oven. The parameters for operation of the heated vacuum chamber are specifically shown in FIG. 6 where the time and temperature are related to the specific processing steps.

An important aspect of the present invention is the manner in which the panel is evacuated. It is typical in the prior art to evacuate insulating containers via a port or tube which is pinched off or otherwise sealed when vacuum draw-down is complete. In the present invention, the use of a vacuum chamber, instead of the prior art technique, is significant in reducing the evacuation time while increasing the quality of the vacuum in the panel. The use of a vacuum chamber causes the jacket 2, initially to expand slightly thereby to facilitate the quick removal of gases during evacuation through the slots 19. In contrast, in the prior art, when a thin-walled vessel at atmospheric pressure is evacuated through a pinch-off tube, the outer wall of the enclosed space tends to collapse or at least deflect inwardly decreasing evacuation efficiency, increasing evacuation time and almost certainly reducing the quality of the vacuum achieved.

While the invention has been described in some detail with respect to the drawings, it will be appreciated that numerous changes in the details and construction of the vacuum panel can be made without departing from the spirit and scope of the invention as set forth in the appended claims.

What is claimed is:

1. A method for manufacturing a vacuum panel comprising the steps of:

a) forming a jacket of metal defining an interior space and an opening communicating with the interior space;

b) filling the interior space with a glass wool insulating media of a density sufficient to oppose the atmospheric force on the jacket after evacuation of the interior space;

c) locating a brazing material adjacent the opening;

d) preheating the panel at atmospheric pressure to reduce the air density in said interior space, expel moisture and increase the velocity of the gas molecules in the interior space thereby to facilitate their evacuation;

e) promptly, after step d), placing the panel in a vacuum chamber to evacuate the interior space; and f) melting the brazing material in the vacuum chamber to seal the opening while maintaining the vacuum.

2. The method according to claim 1 wherein the insulating media has a density of not less than nine pounds per cubic foot.

3. The method according to claim 1 further including the step of locating a getter in the interior space.

4. The method according to claim 1, wherein the brazing material is a nickel-based alloy.

5. The method according to claim 1, wherein the brazing material is BNi-7 per AWS A5.8 with a micro-gap filler comprising a fine granular metal powder having a higher melting temperature than said BNi-7 to assist in sealing said opening.

6. The method according to claim 3, wherein the getter is a molecular sieve in combination with palladium oxide.

7. The method according to claim 1, wherein the panel is preheated in step d) to approximately 600° F.

8. The method according to claim 3, wherein the getter is heat activated after sealing the opening.

9. The method according to claim 3, wherein the getter is heat activated during sealing of the opening.

10. The method according to claim 6, wherein step d) includes the substep of expelling moisture from the molecular sieve.

11. The method according to claim 1, wherein step f) is accomplished by rapidly heating the brazing material to approximately 1800° F., thereby to minimize decomposition and outgassing from the glass wool insulating media.

12. The method according to claim 1, wherein step d) is performed in an oxygen free environment to minimize oxidation of the panel elements.

13. A method for manufacturing a vacuum panel comprising the steps of:

(a) forming a thin-walled jacket of metal to minimize heat transfer defining an interior space and an opening communicating with the interior space;

(b) filling the interior space with an insulating media having a compressive strength sufficient to oppose atmospheric pressure on the jacket after evacuation of the interior space;

(c) locating a getter comprising a molecular sieve in combination with palladium oxide in said interior space;

(d) preheating the panel at atmospheric pressure to reduce the air density, expel moisture and increase the velocity of the gas molecules in the interior space, thereby to facilitate their evacuation.

(e) promptly, after step d) evacuating the interior space and sealing the opening.

14. The method according to claim 13, wherein the step of evacuating the internal space is accomplished in a vacuum chamber.

15. The method according to claim 13 wherein the insulating media comprises a glass wool having a density of not less than nine pounds per cubic foot.

16. The method according to claim 13 wherein the panel is preheated in step d) to approximately 600° F.

17. The method according to claim 13, wherein step D) is performed in an oxygen free environment to minimize oxidation of the panel elements.

* * * * *